United States Patent [19]
Saeda et al.

[11] Patent Number: 5,224,716
[45] Date of Patent: Jul. 6, 1993

[54] TILTING WORKPIECE SUPPORT HAVING FINE ADJUSTMENT MECHANISM

[75] Inventors: Koichi Saeda, Higashiosaka; Shunji Sakura, Kyoto; Tatsuya Hirai, Itami, all of Japan

[73] Assignee: Tsubakimoto Chain Co., Osaka, Japan

[21] Appl. No.: 773,122

[22] Filed: Oct. 8, 1991

[30] Foreign Application Priority Data

Oct. 9, 1990 [JP] Japan .................. 2-105639

[51] Int. Cl.⁵ .................................. B23Q 3/04
[52] U.S. Cl. ....................... 279/5; 219/121.82; 269/70; 409/222
[58] Field of Search ........... 409/135, 144, 215, 220, 409/221, 222, 223, 224; 279/5; 29/48.5 R, 48.5 A, 49; 74/813 L; 269/309, 70; 219/121.82

[56] References Cited

U.S. PATENT DOCUMENTS 1,906,062  4/1933  Harley .......................... 409/223
2,134,234  10/1938  Orcutt et al. ................. 409/222 X
2,942,632  6/1960  Cassey ........................... 29/49 X Primary Examiner—Z. R. Bilinsky
Attorney, Agent, or Firm—Howson & Howson

[57] ABSTRACT

In a workpiece support for use with a laser beam machine tool, in which the workpiece is rotated about an axis tiltable through 90° or more to either side of a vertical condition, the workpiece is held by a chuck driven through a right-angle speed reducer by a servomotor. The chuck, reducer and motor are all supported on a shaft rotatably mounted in bearings on a frame. The shaft is coupled to a disc having angle markings and lockable at discrete rotational positions on the frame. Fine adjustment of the rotational position of the shaft relative to the disc is effected by engagement of an offset protrusion on the end of the shaft by a screw-shifted operating member on the disc. Two such operating members are provided in opposed relationship on opposite sides of the protrusion so that they can be used to lock the shaft and disc securely together.

2 Claims, 6 Drawing Sheets

TILTING WORKPIECE SUPPORT HAVING FINE ADJUSTMENT MECHANISM

BRIEF SUMMARY OF THE INVENTION

This invention relates to workpiece supports for machine tools, and more particularly to an workpiece support having a workpiece holder rotatable on a tiltable axis, with an improved fine adjustment mechanism for adjusting the inclination of the axis of rotation of the workpiece.

In prior workpiece supporting and rotating devices for use with laser beam machine tools, a workpiece gripping and rotating device is mounted on a support shaft which is rotatably mounted in bearings in a frame. The axis of rotation of the workpiece is transverse to the support shaft, and its inclination depends on the rotational position of the support shaft. The ability of the apparatus to allow tilting of the workpiece rotation axis facilitates laser machining.

The apparatus is ordinarily equipped with a mechanism for indicating the inclination of the axis of rotation of the workpiece. The angle indicating mechanism typically comprises a disc which is coaxially coupled to the support shaft and which is provided with angle markings readable against an index pointer mounted on the frame. When the index pointer points to a particular angle marking, e.g. 0°, the axis of rotation of the workpiece is presumed to be situated at that angle with respect to the frame.

However, because of manufacturing errors, or errors which occur in installation of the workpiece support, it sometimes happens that the indicated angle of inclination does not correspond exactly to the true inclination of the axis of rotation of the workpiece. It is therefore necessary, in the final stages of the installation of the workpiece support, to calibrate the angle indicating mechanism by effecting a fine adjustment of the inclination of the angular relationship of the support shaft and the disc.

In the past, this fine adjustment was carried out by temporarily attaching the disc to the shaft with the index pointer on the frame pointing to an origin marking, e.g. the 0° mark, on the disc. Then, the angle of inclination of the workpiece axis of rotation was adjusted to correspond to the indicated angle by tapping on the workpiece gripping device, or on some other element carried on the support shaft, while holding the disc so that the index pointer continued to point to the origin marking. Thereafter, the disc was firmly fixed to the support shaft. It was necessary to repeat this calibration from time to time, because of errors in the indicated angle which occurred slowly during long periods of use.

One problem with the calibration operation described above is that it the adjustment of the angle of inclination by repeated tapping with a hammer was time-consuming. Another problem was that the use of the hammer resulted in damage to various parts of the apparatus.

The principal object of this invention is to provide an improved workpiece support in which the fine adjustment of the angle of inclination of the workpiece axis of rotation can be carried out simply and accurately. Another object of the invention is to eliminate the necessity of tapping parts of the apparatus with a hammer to effect fine adjustment, and thereby eliminate damage caused to the apparatus by use of a hammer. Still another object of the invention is to provide a fine adjustment mechanism which is resistant to dislocation of the mutual relationship between the disc and the support shaft.

The invention addresses these objects by the use of a novel fine adjustment mechanism in a coupling between the disc and the support shaft.

The workpiece support in accordance with the invention comprising a frame, a shaft supported in the frame and rotatable therein about a first axis, and means, supported by the shaft, for holding a workpiece and rotating the workpiece about a second axis transverse to the first axis. The second axis is tiltable in dependence on the rotational position of the shaft. A disc is arranged in coaxial relationship to the shaft and coupled to the shaft. Angle markings, and an index against which said markings are readable, are provided on the frame and the disc for indicating the inclination of the second axis. The coupling means by which the disc is coupled to the shaft comprises an engagement portion fixed on the shaft, and an operation member mounted on the disc and engageable with the engagement portion. The operation member is shiftable with respect to the disc for effecting relative rotation of the shaft and the disc, whereby a fine adjustment of the inclination of the second axis with respect to said disc can be effected by shifting of the operation member.

In the preferred embodiment of the invention, the operation member comprises a pair of parts respectively engageable with opposite sides of the engagement portion.

In the operation of the fine adjustment mechanism in accordance with the invention, the disc is mounted on the support shaft, and a specific angle marking, for example a 0° marking, is positioned directly opposite the index pointer. Then, the operation member on the disc is shifted with respect to the disc so that it abuts and pushes against the engagement portion fixed on the support shaft. This causes a small rotating movement of the shaft with a resulting tilting of the axis of rotation of the workpiece. When the axis of rotation is at the desired inclination, which can be determined by means of a level or other instrument, shifting adjustment of the operation member is stopped, and the disc is securely fixed to the support shaft.

Further objects, advantages and details of the invention will be apparent from the following detailed description, when read in conjunction with the drawings.

DETAILED DESCRIPTION

Figure 1:
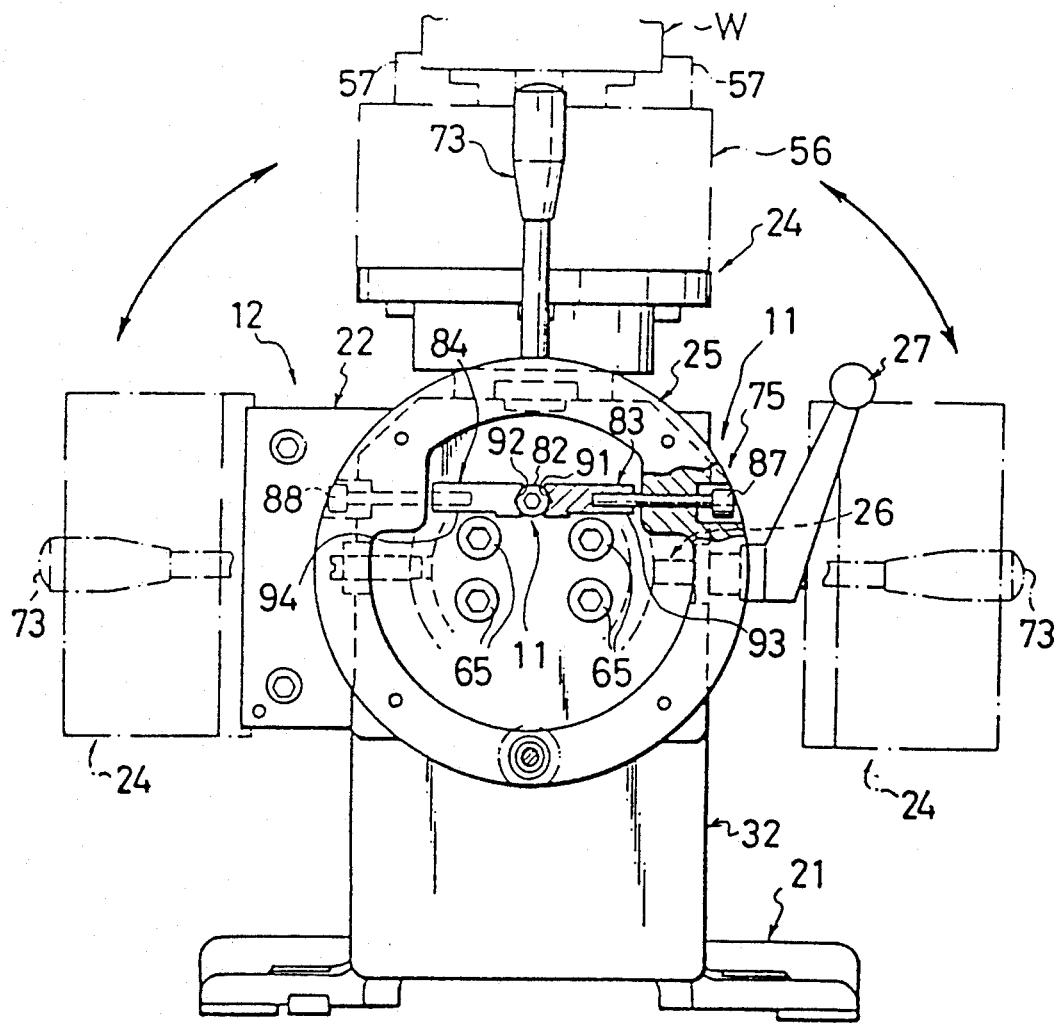
FIG. 1 is a front elevation, partly in section, showing a workpiece support in accordance with the invention.

FIGS. 1-4 show a workpiece support generally designated by reference numeral 12. The support is adapted to be installed on the table of a laser beam machine tool, and comprises a frame 21, a speed reduction unit 22, a servomotor 23, a workpiece gripping and rotating device 24, and an inclination setting mechanism 25.

Figure 2:
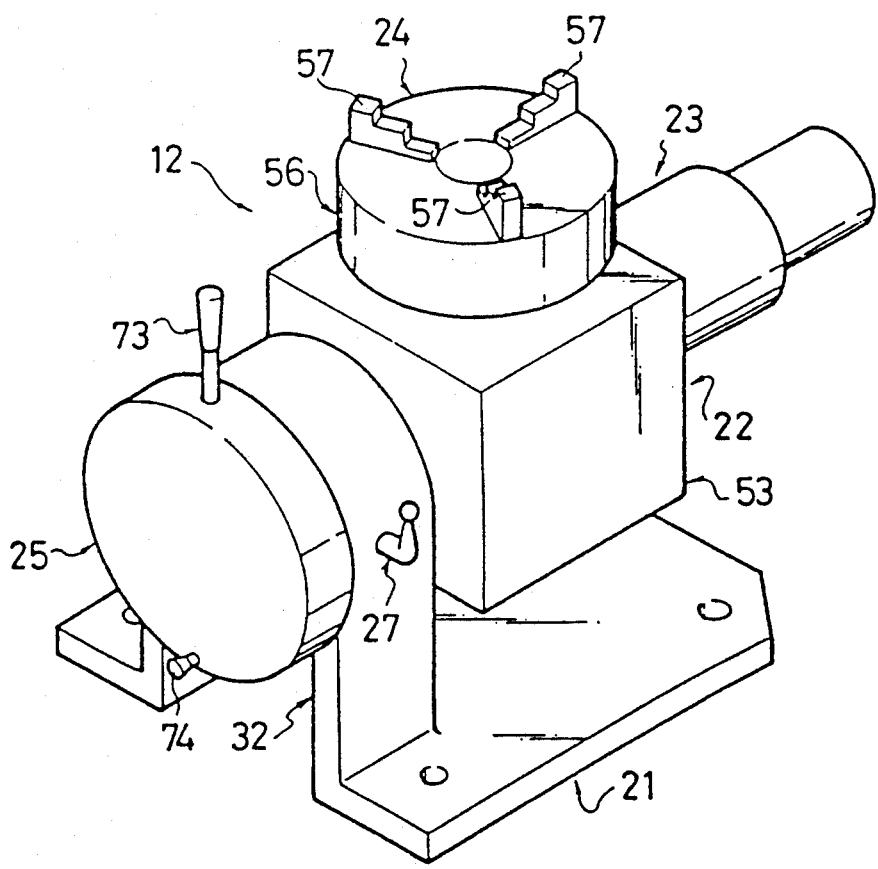
FIG. 2 is a perspective schematic view of the workpiece support.
Figure 3:
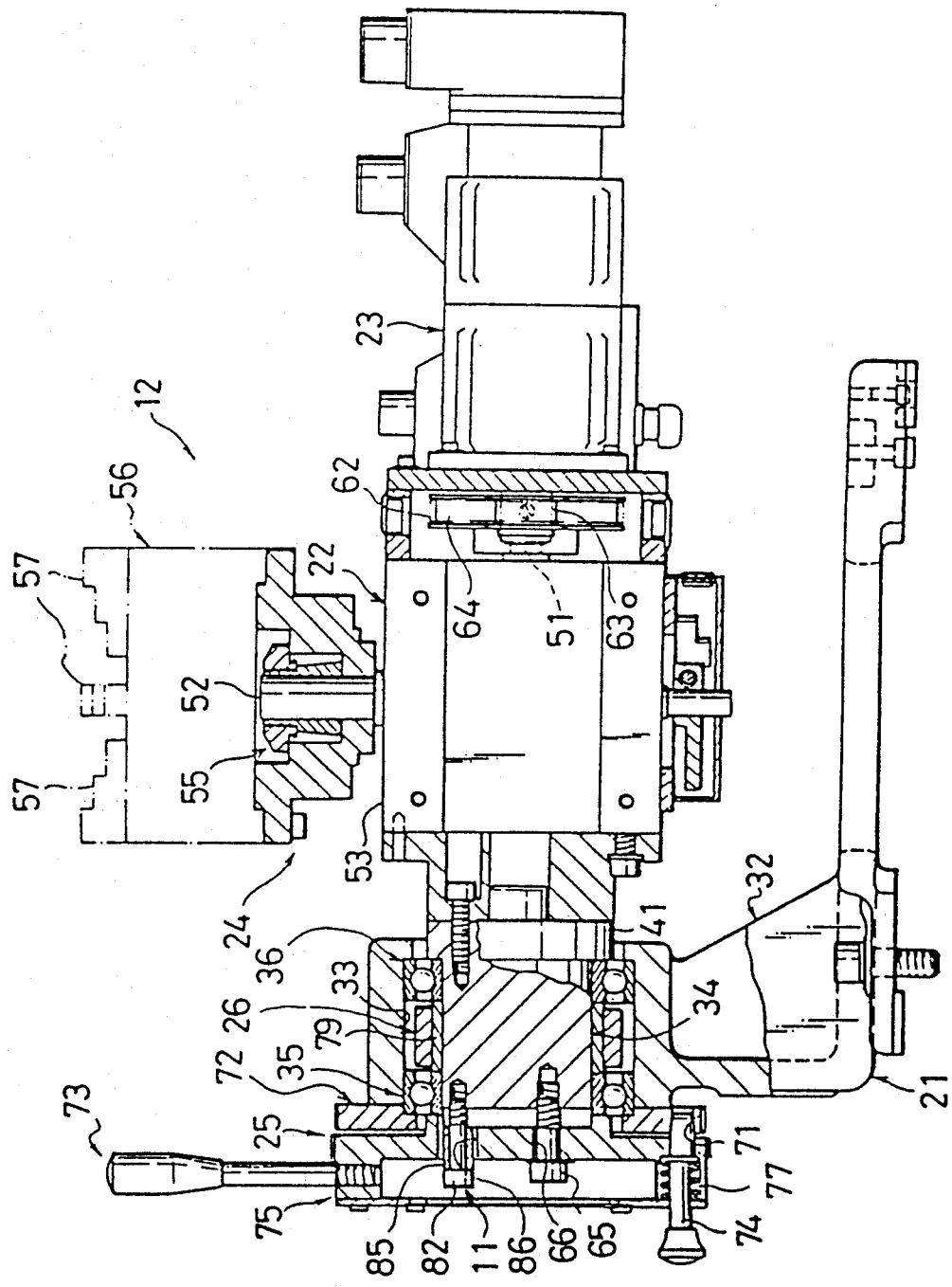
FIG. 3 is an elevation, partly in section, as viewed from the right side of FIG. 1.

Frame 21, best seen in FIGS. 2 and 3, is formed in an L-shaped configuration, having a horizontal portion adapted to be secured to the laser machine table, and an upstanding portion 32 having a hole 33, in which a pair of ball bearings 35 and 36 are situated for rotatably supporting a shaft 34. A swingable locking lever 27 is provided for operating a locking mechanism 26 (FIG. 1), which is used to lock shaft 34 against rotation relative to the frame.

Speed reduction unit 22 is supported on shaft 34 in cantilever fashion with respect to frame 21, and the workpiece gripping and rotating device 24 is supported on, and rotatably driven by, output shaft 52 of the speed reduction unit. Output shaft 52 of the speed reduction unit is disposed in perpendicular relationship to input shaft 51, and also in perpendicular relationship to the axis of rotation of shaft 34.

Workpiece gripping and rotating device 24 includes a conventional chuck 56, having stepped jaws 57 for gripping a workpiece W. The chuck is secured to speed reducer output shaft 52 by a keyless connecting mechanism 55.

Figure 4:
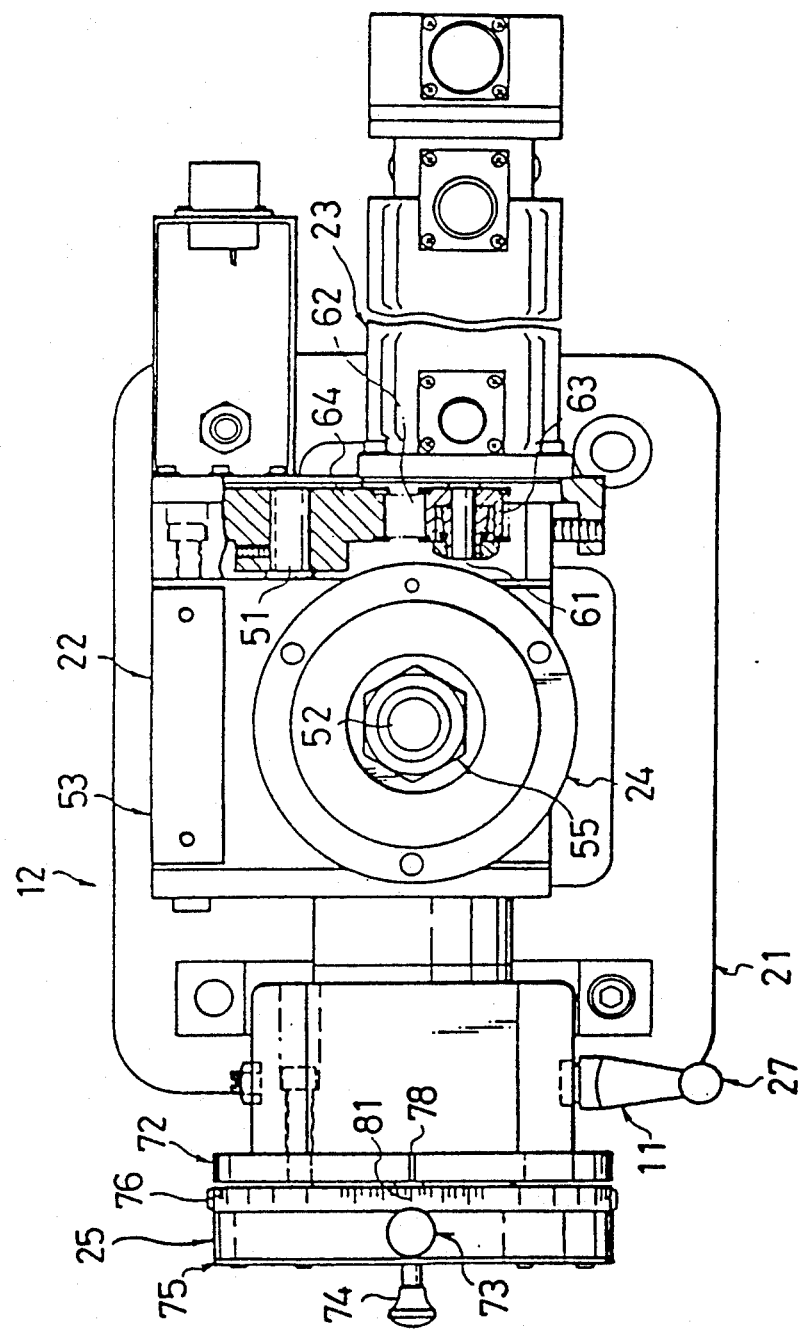
FIG. 4 is a top plan view, also partly in section.

Servomotor 23 is supported on the right side surface of housing 53 of the speed reduction unit (as viewed in FIG. 3). As shown in FIG. 4, input shaft 51 of the speed reduction unit is connected to output shaft 61 of the servomotor through a belt drive consisting of a toothed belt 62 and pulleys 63 and 64.

Preferably, the parts installed on shaft 34, including speed reduction unit 22, servomotor 23, and workpiece gripping and rotating device 24, are situated so that their center of gravity substantially coincides with the axis of rotation of shaft 34.

The inclination setting mechanism 25 is provided on the upstanding portion 32 of frame 21, and comprises a plate 72 and a disc 75, the latter being coupled to the left end of shaft 34 and having a lever 73 through which shaft 34 can be rotated. Plate 72 has a hole 71 near its periphery, as shown in FIG. 3, and, in a typical plate, four such holes are provided, disposed at angular intervals of 90°, all at a uniform radial distance from the axis of shaft 34. Disc 75 is provided with a pin 74 selectively engageable with any of the holes in plate 72 corresponding to hole 71. Pin 74 is continuously urged toward plate 72 by spring 77 (FIG. 3). The tip of pin 74 is preferably tapered, and hole 71, and its corresponding holes (not shown), are correspondingly tapered so as to receive and closely fit the tip of pin 74. The pin allows the disc to be set at any one of several discrete angular positions.

Angle markings 76 (FIG. 4) are provided on the periphery of disc 75. On the outer surface of plate 72 there are formed four grooves 78 (only one of which is shown in FIG. 4). These grooves serve as pointers against which angle markings 76 can be read.

Disc 75, as shown in FIG. 1, is secured to one end of shaft 34 by bolts 65. These bolts extend through holes 66 in disc 75, one such hole being visible in FIG. 3. The holes are slightly larger in diameter than the portions of the bolts which extend through them so that shaft 34 can rotate slightly with respect to disc 75 when the bolts 65 are loosened.

Plate 72 and disc 75, as shown in FIG. 3 respectively press axially against the outer and inner races of bearing 35. In addition, the axial force applied to the inner race of bearing 35, directly by plate 75 and indirectly by plate 72, is transferred through spacer ring 79 to the inner race of bearing 36. This force directly presses the inner race of bearing 36 against a larger diameter part 41 of shaft 34, and indirectly presses the outer race of bearing 36 against a shoulder formed in hole 33, thereby eliminating axial play in the bearings.

In the operation of the workpiece support 12, a workpiece W (see FIG. 1) is gripped by chuck 56. When servomotor 23 is operated, rotational force is transmitted, through motor output shaft 61, pulley 63, belt 62 and pulley 64, to the input shaft of speed reduction unit 22. Output shaft 52 rotates workpiece gripping and rotating device 24, causing the workpiece W to rotate in a horizontal plane, provided the apparatus is in the condition shown in FIG. 2. Because of the speed reduction effected by reducing unit 22 and by the belt and pulley drive mechanism, the workpiece rotates at a speed which is a fraction of the speed of rotation of the servomotor.

When pin 74 is manually pulled out from hole 71 against the force exerted by spring 77, lever 73 can be moved manually to rotate shaft 34, thereby causing the workpiece gripping and rotating device, the servomotor and the speed reduction unit to tilt together. This results in the tilting of the axis of rotation of the workpiece gripping and rotating device. By selectively engaging pin 74 with one of the several holes (corresponding to hole 71) in plate 72, the axis of rotation of the workpiece can be positioned vertically, or 90° on either side of vertical, as shown in FIG. 1. Thus, the apparatus enables the axis of rotation of the workpiece to be tilted, as required for laser processing of the workpiece, and holds the axis of rotation of the workpiece in the selected position while rotation of the workpiece takes place.

The fine adjustment mechanism, generally indicated by reference numeral 11, provides for fine adjustment of the inclination of the workpiece gripping and rotating device while disc 75 is held fixed with respect to the frame, with one of its angle markings 76, e.g. zero degree mark 81 being in register with a pointer groove 78. Referring to FIGS. 1 and 3, fine adjustment mechanism 11 comprises a shaft or engagement member 82 protruding from the end of shaft 34, and a pair of adjustment shafts or operation members 83 and 84.

Member 82 is in the form of a bolt which is threaded into the end of shaft 34 and extends through hole 86 in disc 75. Member 82 and is parallel to, but radially spaced from, the axis of shaft 34. A sleeve 85 is provided on the outer surface of shaft member 82, and has a diameter which is somewhat smaller than that of hole 85. Operation members 83 and 84 (FIG. 1) are connected to disc 75 by adjusting screws 87 and 88 respectively. The tips of members 83 and 84 have V-shaped grooves 91 and 92 respectively, and the outer surfaces of members 83 and 84 are formed with flat portions 93 and 94 (seen in FIGS. 1, 7 and 8).

Figure 5:
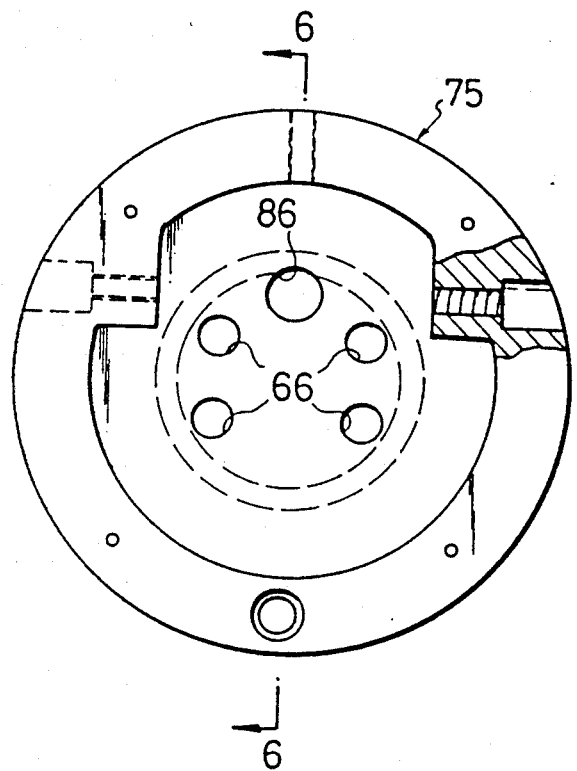
FIG. 5 is a front elevation of an end plate, also partly in section.
Figure 6:
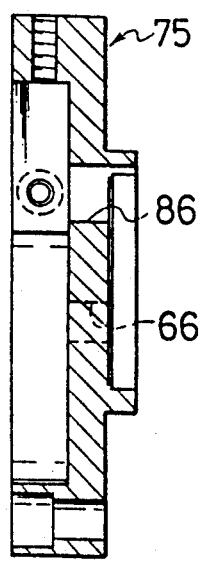
FIG. 6 is a vertical section taken on plane 6—6 of FIG. 5.
Figure 7:
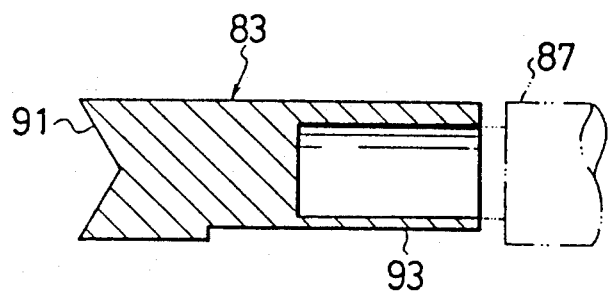
FIG. 7 is an axial section of the adjustment shaft.
Figure 8:
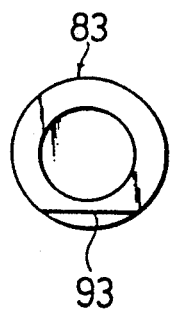
FIG. 8 is an elevation of the adjustment shaft, as seen from the right side of FIG. 7.

V-shaped grooves 91 and 92 of operating members 83 and 84 engage opposite sides of engagement member 82. Screws 87 are threaded into threaded passages formed in disc 75, as seen in FIGS. 1 and 5, and there heads are located in recesses in the periphery of the disc so that they are accessible by hand-held drivers. The tips of screws 87 and 88 freely rotate in blind, circular-cylindrical holes formed in the ends of members 83 and 84, as illustrated in FIGS. 1 and 7. Engagement of the flat surfaces 93 and 94 of members 83 and 8 with the heads of adjacent bolts 85 prevents members 83 and 84 from rotating.

In the operation of the fine adjustment device, lock lever 27 is rotated counterclockwise to release shaft 34 for rotation. Lever 73 is tilted so that an angle marking, e.g. 0° mark 81, is brought into register with pointing groove 78. Pin 74 is then inserted into a hole 71 in plate 72.

Next, the four bolts 65 are loosened so that shaft 34 can rotate with respect to disc 75. Adjustment screws 87 and 88 are operated, one being loosened by counterclockwise rotation of its head, and the other being tightened by clockwise rotation of its head. The operating member whose adjustment screw is rotated clockwise advances against engagement member 82, and thereby causes shaft 34 to rotate. For example, when member 83 is shifted to the left (as viewed in FIG. 1) by clockwise rotation of adjusting screw 87, shaft 34 rotates slightly in the counterclockwise direction. Similarly, when member 84 is advanced against engagement member 82 by clockwise rotation of adjusting screw 88, shaft 34 rotates slightly in the clockwise direction. In this way, the axis of rotation of the workpiece can be brought to an inclination corresponding to the angle indicated by angle markings and pointer groove 78.

Following adjustment of the rotational position of shaft 34 by shifting of one or the other of operating members 83 and 84, shaft 34 is locked by clockwise rotation of lock lever 27. Finally, bolts 65 are tightened so that disc 75 is fixed with respect to shaft 34. This completes the fine adjustment of the inclination of the axis of rotation of the workpiece.

If desired, adjustment screws 87 and 88 can both be rotated clockwise until engagement member 82 is firmly engaged on its opposite sides by engagement members 83 and 84. This is advantageous in that it prevents undesired movement of members 83 and 84 and their adjusting screws 87 and 88. It is also advantageous in that it more completely secures disc 75 and shaft 34 against relative rotation.

As will be apparent from the foregoing description, the mechanism permits fine adjustment of the inclination of the axis of rotation of the workpiece to be carried out in a simple manner, and with high accuracy. It avoids the necessity of repeated tapping with a hammer to effect adjustment, and eliminates damage to parts caused by the use of a hammer. In addition, by providing operating members 83 and 84 on opposites sides of engagement member 82, the invention makes it possible to provide substantially complete assurance against dislocation of the mutual relationship between disc 75 and shaft 34, by tightening the operating members against the engagement member after the fine adjustment operation is completed.

Various modifications can be made to the apparatus described. For example, the adjusting screws can be threaded into the operating members and journalled in openings in disc, if appropriate thrust bearings are provided for the adjusting screws. The invention can be incorporated into a work support apparatus in which rotation of the support shaft is effected through a speed reducer or by a motor drive, Various other modifications can be made to the apparatus described herein without departing from the scope of the invention as defined in the following claims.

We claim:

1. An improved workpiece support for a laser beam machine tool, said support comprising a frame, a shaft supported in said frame and rotatable therein about a first axis, means, supported by said shaft, for holding a workpiece and rotating the workpiece about a second axis transverse to said first axis, said second axis being tiltable in dependence on the rotational position of said shaft, a disc fixed in coaxial relationship to said shaft, coupling means for interengaging said disc and said frame at any selected one of plural discrete tilt angles of said second axis, and means, on said frame and on said disc, providing angle markings and an index against which said markings are readable for indicating the selected tilt angle; the improvement comprising an engagement portion fixed on said shaft, and means providing an operation member mounted on said disc and engageable with said engagement portion, said operation member being shiftable with respect to said disc for effecting relative rotation of the shaft and the disc and providing thereby fine adjustment of the selected tilt angle of said second axis with respect to said frame.

2. A workpiece support according to claim 1 in which said operation member comprises a pair of parts respectively engageable with opposite sides of said engagement portion.

* * * * *

UNITED STATES PATENT AND TRADEMARK OFFICE
CERTIFICATE OF CORRECTION

PATENT NO. : 5,224,716

DATED : July 6, 1993

INVENTOR(S) : Koichi Saeda; Shunji Sakura and Tatsuya Hirai

It is certified that error appears in the above-identified patent and that said Letters Patent is hereby corrected as shown below:

Column 5, line 1, "8" should be -- 84 --.

Signed and Sealed this

Fifteenth Day of February, 1994

Attest:

BRUCE LEHMAN

*Attesting Officer*  *Commissioner of Patents and Trademarks*